United States Patent
Bruhn et al.

(10) Patent No.: US 9,839,040 B2
(45) Date of Patent: Dec. 5, 2017

(54) MITIGATING WIRELESS INTERFERENCE

(71) Applicant: EchoStar Technologies L.L.C., Englewood, CO (US)

(72) Inventors: Christopher William Bruhn, Aurora, CO (US); Phuc H. Nguyen, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 315 days.

(21) Appl. No.: 14/090,373

(22) Filed: Nov. 26, 2013

(65) Prior Publication Data
US 2015/0146625 A1  May 28, 2015

(51) Int. Cl.
*H04W 72/08* (2009.01)
*H04L 1/00* (2006.01)
*H04W 28/16* (2009.01)
*H04W 84/12* (2009.01)

(52) U.S. Cl.
CPC ............ *H04W 72/082* (2013.01); *H04L 1/00* (2013.01); *H04W 28/16* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,930,993 | B1 * | 8/2005 | Hamada et al. | 370/347 |
| 7,206,840 | B2 * | 4/2007 | Choi et al. | 709/225 |
| 7,593,356 | B1 | 9/2009 | Friday | |
| 2002/0067709 | A1 * | 6/2002 | Yamada et al. | 370/337 |
| 2003/0219030 | A1 * | 11/2003 | Gubbi | H04L 12/403 370/442 |
| 2003/0231621 | A1 * | 12/2003 | Gubbi | H04B 17/382 370/352 |
| 2004/0127191 | A1 * | 7/2004 | Matsunaga | H04W 16/14 455/403 |
| 2004/0127259 | A1 * | 7/2004 | Matsunaga | 455/560 |
| 2006/0268785 | A1 * | 11/2006 | Park et al. | 370/331 |
| 2007/0263587 | A1 * | 11/2007 | Savoor | H04L 41/5019 370/346 |

(Continued)

FOREIGN PATENT DOCUMENTS

| EP | 2326116 A1 | 5/2011 |
|---|---|---|
| WO | 2013-026468 A1 | 2/2013 |

OTHER PUBLICATIONS

International Search Report and Written Opinion for PCT/US2014-062078 dated May 4, 2015 (20 pages).

(Continued)

*Primary Examiner* — Steven H Nguyen
(74) *Attorney, Agent, or Firm* — Bejin Bieneman PLC

(57) ABSTRACT

A system includes a server configured to monitor wireless interference between at least two media content delivery devices. The server coordinates communication with the media content delivery devices to reduce wireless interference, and the communication is coordinated according to requirements of media content requests received from the media content delivery devices. A method includes monitoring wireless interference between at least two media content delivery devices and coordinating communication with the media content delivery devices to reduce wireless interference.

17 Claims, 4 Drawing Sheets

(56) References Cited

U.S. PATENT DOCUMENTS

| | | | |
|---|---|---|---|
| 2008/0270528 A1* | 10/2008 | Girardeau | H04L 1/0007 709/203 |
| 2009/0161626 A1* | 6/2009 | Crawford et al. | 370/331 |
| 2009/0224967 A1* | 9/2009 | Wang | G01S 19/46 342/357.64 |
| 2010/0040134 A1* | 2/2010 | Sun | H04L 47/11 375/240.01 |
| 2012/0057462 A1* | 3/2012 | Kotecha et al. | 370/236 |
| 2012/0157138 A1* | 6/2012 | Senda | H04J 11/0056 455/501 |
| 2012/0257585 A1 | 10/2012 | Sydor | |
| 2013/0003591 A1* | 1/2013 | Novak et al. | 370/252 |

OTHER PUBLICATIONS

International Preliminary Report on Patentability for PCT/US2014/062078 dated Jun. 9, 2016 (15 pages).

* cited by examiner

MITIGATING WIRELESS INTERFERENCE

BACKGROUND

Wireless devices are increasingly common in households. In addition to cell phones, computers, and set top boxes, appliances such as refrigerators and washing machines can be equipped for wireless communication. To accommodate wireless devices, wireless networks are set up in many homes and offices. In higher density residential and commercial areas, coverage areas of wireless networks often overlap.

DETAILED DESCRIPTION

An exemplary system includes a server configured to monitor wireless interference between at least two media content delivery devices. The server coordinates communication with the media content delivery devices to reduce wireless interference, and the communication is coordinated according to requirements of media content requests made by the media content delivery devices. A method includes monitoring wireless interference between at least two media content delivery devices and coordinating communication with the media content delivery devices to reduce wireless interference.

Figure 1:
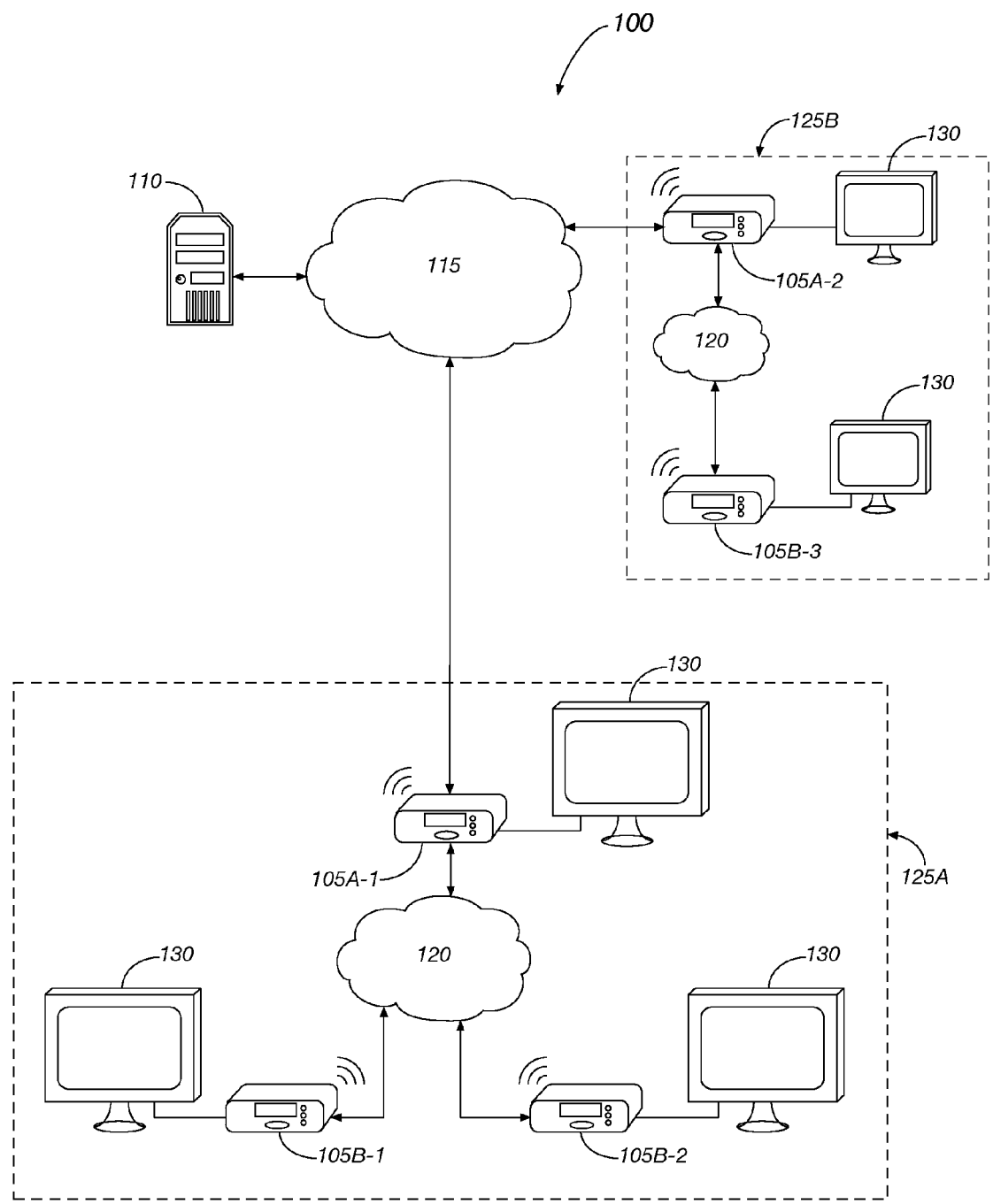
FIG. 1 illustrates an exemplary system for reducing wireless interference between media content delivery devices.

FIG. 1 illustrates an exemplary system 100 for coordinating wireless communications to prevent interference. The system may take many different forms and include multiple and/or alternate components and facilities. While an exemplary system is shown, the exemplary components illustrated are not intended to be limiting. Indeed, additional or alternative components and/or implementations may be used.

As illustrated in FIG. 1, the system 100 includes media content delivery devices 105, including access points 105A and client devices 105B, and a server 110. The system 100 may further include a content provider network 115 that facilitates communication between the access point 105A and the server 110 and a local network 120 that facilitates communication between the access point 105A and, e.g., one or more client devices 105B. For example, the content provider network 115 may include a wide area network (WAN) and the local network 120 may include a local area network (LAN), which could include a wireless local area network (WLAN), relative to a particular customer premises 125 such as a household or office.

The access points 105A-1 and 105A-2 may be configured to receive media content from the server 110 via the content provider network 115. Examples of media content may include live television, video-on-demand, voice-over-IP (VOIP), games, Internet access, or the like. In some possible approaches, the access point 105A may present media content via a display screen such as, e.g., a television 130. In addition to receiving and presenting media content, the access point 105A may be configured to collect information about the way the client devices 105B receives media content over the local area network and detect interference with other wireless networks. For example, the access point 105A may be configured to measure and/or detect the signal strengths of each client device 105B in the household. An alternative or additional metric may include, e.g., the bit rate at which data is received at the access point 105A and/or the client devices 105B. The access point 105A may be configured to communicate on different channels within the local network 120. In addition, the access point 105A may command one or more client devices 105B to switch to a different communication channel. Thus, to reduce interference, the access point 105A may select a particular channel of the local network 120 and command one or more client devices 105B to communicate over the local network 120 on the selected channel, which may be the same or different from the channel currently being used by one or more client devices 105B. The channel on which the access point 105A communicates may be determined by the access point 105A or alternatively may be based on a command received from the server 110. Likewise, the channel on which the access point 105A commands the client devices 105B to communicate may be determined by the access point 105A or alternatively may be based on a command received from the server 110. While only one access point 105A is shown in FIG. 1, the system 100 may include any number of access points 105A. For example, each customer premises 125 may have at least one access point 105A.

The client devices 105B may be configured to receive media content wirelessly from the access point 105A via, e.g., the local network 120. Moreover, the client devices 105B may be configured to decode media content signals and output the media content to a television 130 or other display device. Thus, the client devices 105B may each include components such as a network interface device, a tuner, and an output device interface. The client devices 105B may be located at the same or different customer premises 125. For example, in FIG. 1, two client devices 105B-1 and 105B-2 are shown in a first household 125A and a third client device 105B-3 is shown in a second household 125B. The second household 125B may further include an access point 105A-2 in communication with the client device 105B-3 via the local network 120. The system 100 may include any number of client devices 105B located at any number of customer premises 125.

The server 110 may be configured to monitor wireless interference between at least two media content delivery devices 105, such as between two client devices 105B, on the same or different local networks 120 and coordinate communication with the media content delivery devices 105 to reduce wireless interference. The interference may be caused by various network-related factors including the demands placed on the local network 120 and/or the content provider network 115. Another network-related factor may include interference caused by wireless signals originating from a different customer premises 125. For example, signals resulting from network communication in one household 125A may interfere with network communication in a neighboring household 125B, even if the network communication occurs on different channels. Accordingly, the server 110 may be configured to receive, from the client device 105B-3, network information, such as a SSID and/or MAC address of the interfering access point 105A-1.

The server 110 may monitor wireless interference between two or more client devices 105B based on the signal strengths or other metrics detected by, e.g., the access point 105A and/or client devices 105B. Examples of other metrics may include signal strengths of the access points 105A relative to one or more client devices 105B located at the same or different customer premises 125, the signal strengths of client devices 105B relative to the access point 105A located at the same or different customer premises 125 than the access point 105A, the PHY rate from the access point 105A to each client device 105B, network information including the SSID, MAC address (BSSID), connected clients as represented by, e.g., their MAC addresses and operating channel, the desired data rates of media content intended to be transmitted to each client device 105B and the actual data rate achieved, packet loss info, etc. The server 110 may coordinate network communication by commanding the access points 105A to communicate with the client devices 105B on different channels that do not interfere or by commanding the access points 105A to communicate with the client devices 105B on the same channel while also optionally coordinating the times when media content delivery devices 105 transmit. Moreover or alternatively, the server 110 may command one or more of the media content delivery devices 105 to reduce their respective transmission powers to reduce interference. The server 110 may send these and possibly other commands to each access point 105A. In other words, the server 110 may develop a plan to reduce interference and execute the plan by sending signals to the access point 105A. The signals may also contain commands for the client devices 105B that the access point 105A could relay.

The server 110 may be configured to receive media content requests from one or more of the media content delivery devices 105. If the server 110 knows what content has been requested by the access point 105A and the client devices 105B, the server 110 can determine what network resources are needed to accommodate each request and coordinate communication accordingly (i.e., according to the requirements associated with the media content requests). The requirements may include the bit rate requirements of the media content, the estimated air time needed to send the requested media content, etc. Moreover, the server 110 may receive feedback from, e.g., the access point 105A to determine the effect of the coordinated communication on wireless interference. Therefore, the server 110 may learn the effectiveness of various ways of coordinating communication among media content delivery devices 105 to improve such coordination over time.

In general, computing systems and/or devices, such as the access point 105A, the client devices 105B, and the server 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, set top box, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2A:
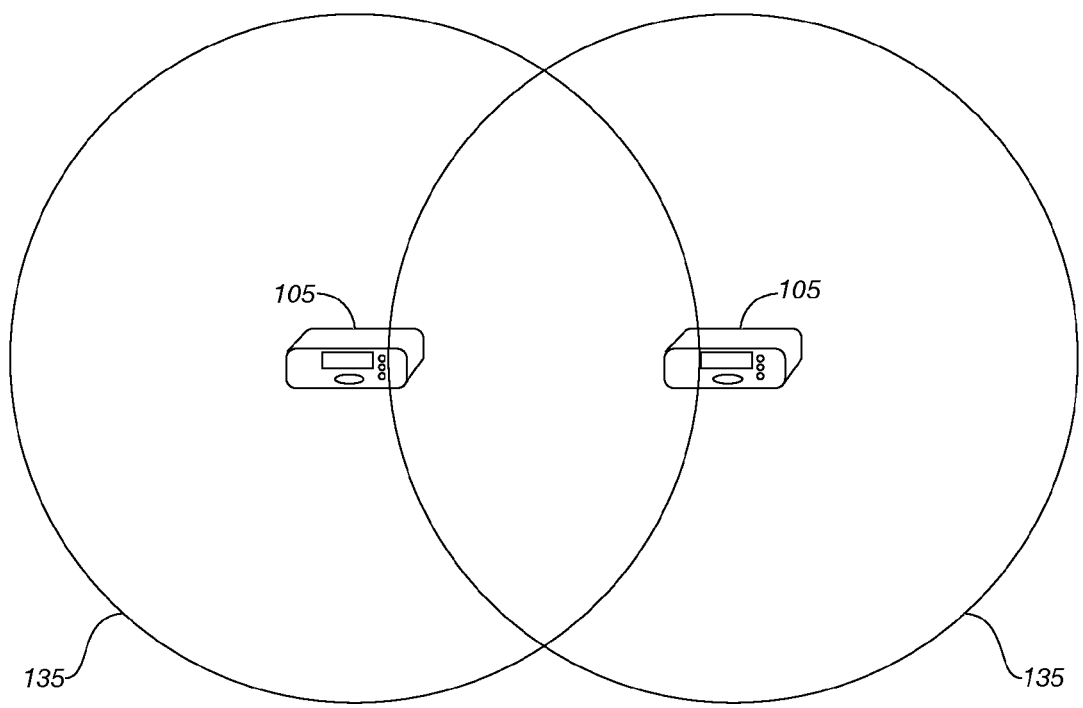
FIGS. 2A-2B illustrate how communication among media content delivery devices can be coordinated to reduce transmission power.
Figure 2B:
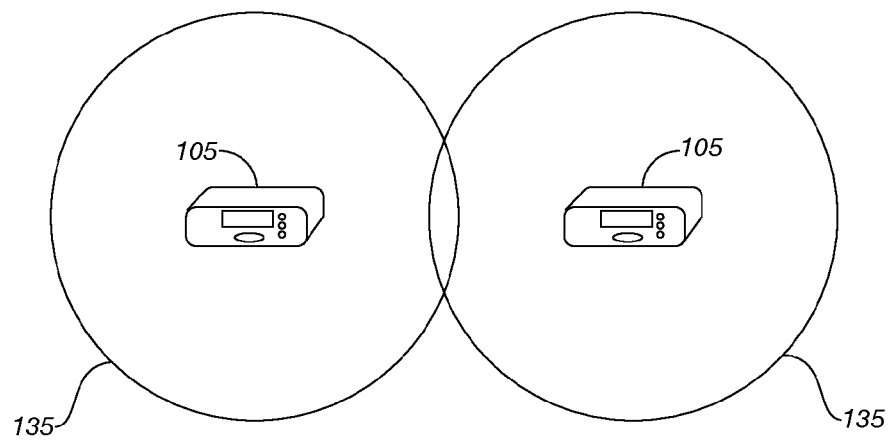

FIGS. 2A-2B illustrate examples of how communication among media content delivery devices 105 may be coordinated. As shown in FIG. 2A, each media content delivery device 105 has a communication range 135 that represents how far the media content delivery device 105 can communicate wirelessly. As shown, the communication ranges 135 of two media content delivery devices 105 at least partially overlap, which could potentially result in wireless interference. FIG. 2B illustrates how reducing the communication range 135 of one or both of the media content delivery devices 105 may reduce wireless interference while still permitting each device 105 to receive media content from the server 110 (not shown in FIGS. 2A-2B for purposes of simplicity) or their respective access points 105A (not shown in FIGS. 2A-2B for purposes of simplicity).

Figure 3A:
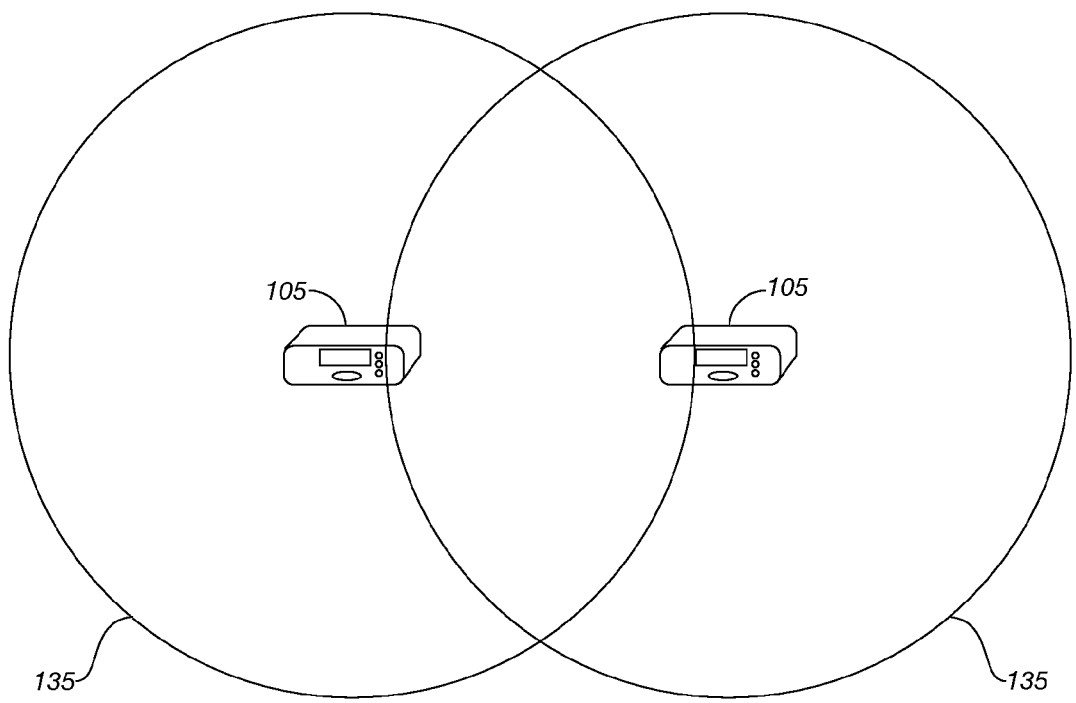
FIGS. 3A-3B illustrate how communication among media content delivery devices can be coordinated by causing different devices to communication on different channels.
Figure 3B:
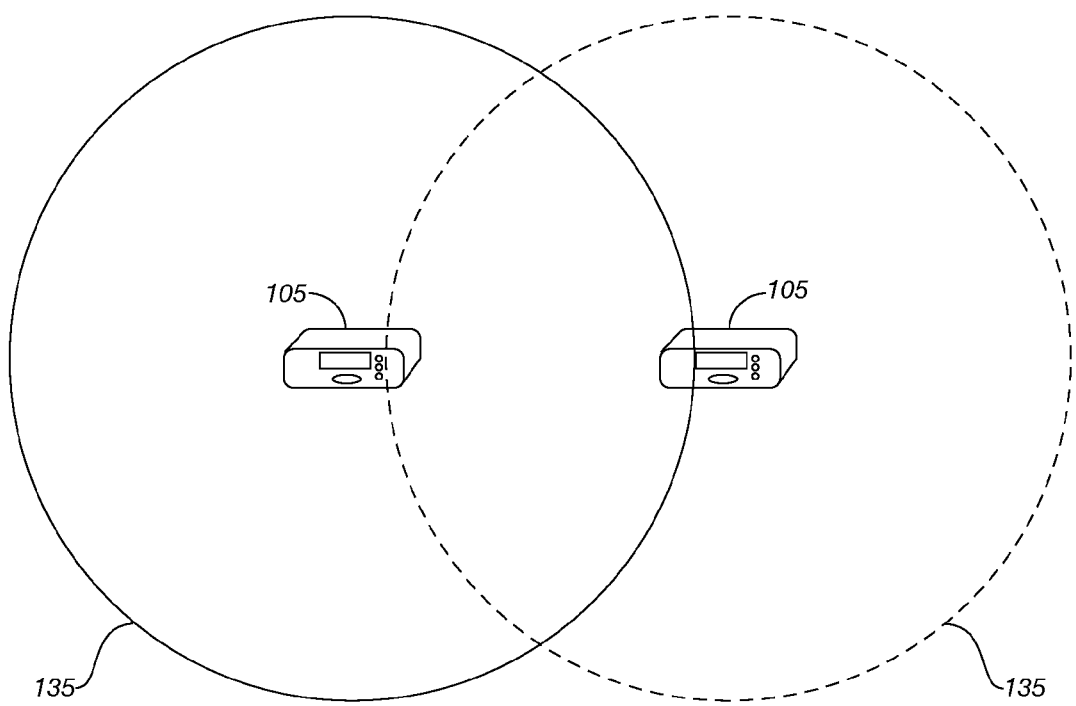

FIGS. 3A-3B illustrate another example of how communication may be coordinated. Referring now to FIG. 3A, one of the media content delivery devices 105 is within the communication range 135 of another media content delivery device 105. The server 110 may command the media content delivery devices 105 to wirelessly communicate on different wireless channels (represented by a dashed line in FIG. 3B).

Figure 4:
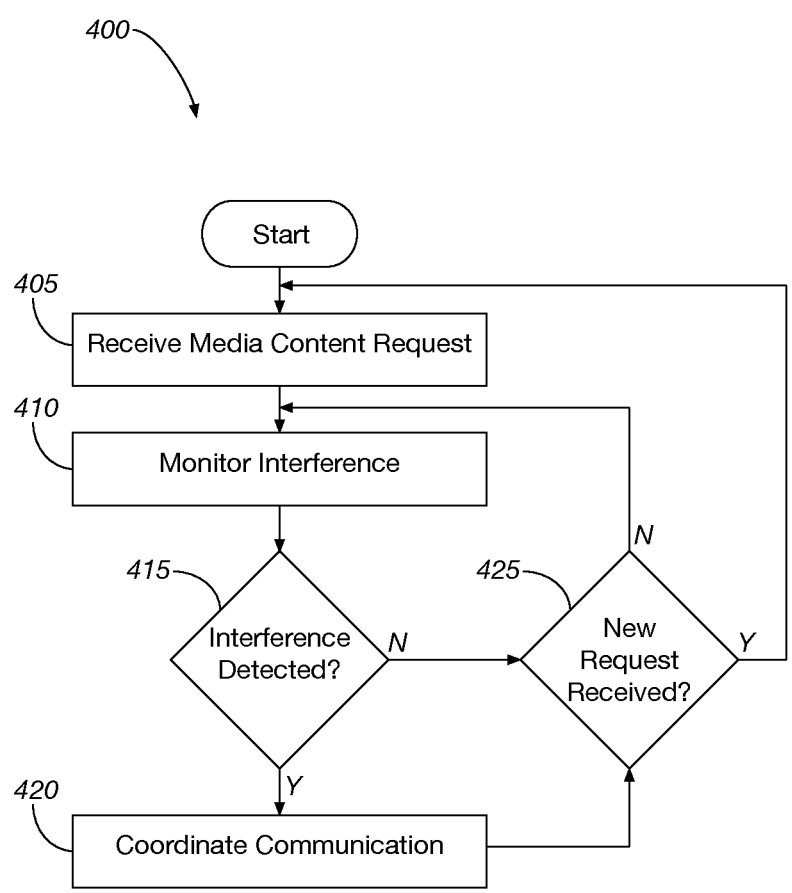
FIG. 4 is a flowchart of an exemplary process that may be implemented by the system of FIG. 1.

FIG. 4 illustrates an example process 400 that may be implemented by the system 100 of FIG. 1. Specifically, the process 400 may be executed by the server 110 to coordinate communication among media content delivery devices 105 to reduce wireless interference.

At block 405, the server 110 may receive requests for media content from one or more media content delivery devices 105 including the access point 105A and/or the client devices 105B. Examples of media content may include live television, video-on-demand, voice-over-IP (VOIP), games, Internet access, or the like. From the media content requests, the server 110 may further determine what network resources are needed to accommodate each request.

At block 410, the server 110 may monitor wireless interference between two or more media content delivery devices 105. Monitoring wireless interference may be based on signal strengths, packet loss, achievable data rate, or other metrics. In some implementations, the metrics are measured by one or more access points 105A and communicated to the server 110.

At decision block 415, the server 110 may determine whether interference was detected at block 410. The server 110 may determine whether wireless interference exists from the metrics received from the access point 105A, or alternatively, the access point 105A may determine whether interference exists and send a signal to the server 110 indicating the existence of the interference. If interference was detected, the process 400 may continue at block 420. If no interference was detected, the process 400 may continue at decision block 425.

At block 420, the server 110 may coordinate communication with the media content delivery devices 105, including the access points 105A and client devices 105B, to reduce wireless interference. Coordinating communication may include commanding one or more of the media content delivery devices 105 to communicate on a different channel, commanding the media content delivery devices 105 to communicate on the same channel while also optionally coordinating transmission times, and/or commanding one or more of the media content delivery devices 105 to reduce its signal transmission power. Moreover, any coordination by the server 110 may account for requirements of the media content requests received at block 405. That is, the server 110 may coordinate communication in a way that reduces wireless interference among the media content delivery devices 105 while allowing each media content delivery device 105 to provide the requested content with a sufficient level of quality.

At decision block 425, the server 110 may determine whether a new request for media content has been received. If so, the process 400 may return to block 405. If no new requests have been received, the process 400 may return to block 410. By returning to blocks 405 or 410, the server 110 may continually monitor the wireless interference based on media content delivery requirements, and thus, the effect of any previous attempts to coordinate communication with the media content delivery devices 105.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
   a server programmed to monitor wireless interference between at least two media content delivery devices programmed to decode and output media content and coordinate communication with the media content delivery devices to reduce wireless interference,
   wherein the server is programmed to coordinate communication according to requirements of media content requests made by the media content delivery devices and by commanding at least one of the media content delivery devices to reduce a transmission power,
wherein the server receiving the media content request causes the server to monitor the wireless interference between the at least two media content delivery devices.

2. The system of claim 1, wherein the server coordinates communication by commanding at least one of the media content delivery devices to communicate on a different channel.

3. The system of claim 1, wherein the server coordinates communication by commanding the media content delivery devices to communicate on the same channel.

4. The system of claim 3, wherein the server commands the media content delivery devices to communicate on the same channel at particular times.

5. The system of claim 1, wherein the server monitors wireless interference between the media content delivery devices based on at least one of a signal strength, network information, packet loss, and achievable data rate associated with at least one of the media content delivery devices.

6. The system of claim 1, wherein the media content delivery devices includes an access point and at least one client device, wherein the access point receives a command from the server directing the access point to communicate with a particular client device on a particular channel.

7. The system of claim 1, wherein the media content delivery devices includes an access point located at a first customer premises and at least one client device located at another customer premises, wherein the server coordinates communication in response to the access point wirelessly interfering with the at least one client device.

8. The system of claim 1, wherein the server is configured to receive media content requests from the media content delivery devices.

9. The system of claim 1, wherein the server is configured to determine an effect of the coordinated communication on wireless interference between the media content delivery devices.

10. A method comprising:
receiving a media content request from one of at least two media content delivery devices programmed to decode and output media content;
monitoring wireless interference between the at least two media content delivery devices, wherein the monitoring is caused by the receipt of the media content request; and
coordinating communication with the media content delivery devices to reduce wireless interference by commanding at least one of the media content delivery devices to reduce a transmission power,
wherein the communication is coordinated according to requirements of media content requests made by the media content delivery devices.

11. The method of claim 10, wherein coordinating communication includes commanding at least one of the media content delivery devices to communicate on a different channel.

12. The method of claim 10, wherein coordinating communication includes commanding the media content delivery devices to communicate on the same channel.

13. The method of claim 12, further comprising commanding the media content delivery devices to communicate on the same channel at particular times.

14. The method of claim 10, wherein wireless interference between the media content delivery devices is monitored based on at least one of signal strengths of the media content delivery devices, packet losses of the media content delivery devices, and achievable data rates of the media content delivery devices.

15. The method of claim 10, further comprising continually monitoring wireless interference after initially coordinating communication with the media content delivery devices.

16. A system comprising:
a plurality of media content delivery devices including an access point and at least one client device, wherein at least one of the media content delivery devices is programmed to transmit a media content request and wherein each of the plurality of media content delivery devices is programmed to decode and output media content;
a server configured to receive the media content request from one of the plurality of media content delivery devices, and as a result of receiving the media content request, monitor wireless interference between at least two of the media content delivery devices and coordinate communication with the media content delivery devices to reduce wireless interference by at least one of:
commanding the access point and the client device to communicate on different channels,
commanding the access point and the client device to communicate on the same channel at particular times, and
commanding at least one of the access point and the client device to reduce a transmission power;
wherein the server monitors wireless interference between the media content delivery devices based on signal strengths of the media content delivery devices received from the access point; and
wherein the access point is configured to receive commands from the server and to communicate with particular client devices as commanded by the server.

17. The system of claim 16, wherein the server is configured to receive media content requests from the media content delivery devices and coordinate communication with the media content delivery devices according to requirements associated with the media content requests.

* * * * *